United States Patent [19]

Mizuno et al.

[11] Patent Number: 4,476,376
[45] Date of Patent: Oct. 9, 1984

[54] DIRECT-CURRENT ARC WELDING MACHINE HAVING CURRENT CONTROL FOR PREVENTING ARC EXTINCTION FOLLOWING SHORT CIRCUITS

[75] Inventors: Takaji Mizuno; Hirohisa Segawa, both of Aichi; Shigeo Ueguri, Hyogo; Yooichiro Tabata, Hyogo; Seigo Hiramoto, Hyogo, all of Japan

[73] Assignee: Mitsubishi Denki Kabushiki Kaisha, Tokyo, Japan

[21] Appl. No.: 384,706

[22] Filed: Jun. 3, 1982

[30] Foreign Application Priority Data

Jun. 5, 1981 [JP] Japan .................................. 56-86694

[51] Int. Cl.³ .............................................. B23K 9/10
[52] U.S. Cl. .......................... 219/130.21; 219/137 PS
[58] Field of Search ...................... 219/130.21, 130.33, 219/130.32, 130.31, 137 PS

[56] References Cited

U.S. PATENT DOCUMENTS

| | | | |
|---|---|---|---|
| 3,792,225 | 2/1974 | Needham et al. | 219/130.21 |
| 3,928,746 | 12/1975 | Ericsson | 219/130.33 |
| 3,961,154 | 6/1976 | Ericsson | 219/130.33 |
| 4,349,720 | 9/1982 | Mäkimaa | 219/130.33 |

FOREIGN PATENT DOCUMENTS

55-149778  11/1980  Japan .............................. 219/130.21

*Primary Examiner*—C. C. Shaw
*Attorney, Agent, or Firm*—Sughrue, Mion, Zinn, Macpeak and Seas

[57] ABSTRACT

A DC welding device is provided with an adder which sums the signals from a base current setting circuit and a shorting current setting circuit and applies the same to a welding current control unit. When a short circuit occurs, the shorting current circuit outputs a gradually increasing signal until the short is removed, whereupon a gradually decreasing signal, which reaches zero after a predetermined time, is output.

4 Claims, 4 Drawing Figures

DIRECT-CURRENT ARC WELDING MACHINE HAVING CURRENT CONTROL FOR PREVENTING ARC EXTINCTION FOLLOWING SHORT CIRCUITS

BACKGROUND OF THE INVENTION

The present invention relates to an improved direct-current (DC) arc welding machine, and more particularly, to an improved method of controlling applied to a DC arc welding machine.

A block diagram of a conventional DC arc welder is shown in FIG. 1, wherein the numeral 1 indicates a consumable elctrode (hereunder referred to as a wire), 2 is an arc, 3 is a workpiece (hereunder referred to as the base metal), 4 is a DC power supply including a welding transformer, 5 is a switching element for controlling the welding current supplid from the DC supply to the arc 2, 6 is a drive circuit for driving the switching element 5, 7 is variable resistor for controlling the feed rate of the wire, across which a given voltage is applied, 8 is a motor control circuit for controlling the rotation of a motor according to the value at which the variable resistor 7 is set, and 9 is the wire feeding motor. Reference numeral 10 designates a drive roller driven by the wire feeding motor 9 to feed the wire 1 toward the base metal 3, and 11 is a base current setting circuit for setting the welding current flowing through the arc 2 in accordance with the value to which the variable resistor 7 is set. A shorting detection circuit 12 can detect a short circuit between the wire 1 and the base metal 3, and shorting current setting circuit 13 supplies a large shorting current to the wire in response to a command from the shorting detection circuit 12 and also supplies a large current in a period immediately following the removal of the short circuit. A selector circuit 14 discriminates, in accordance with a command from the shorting detection circuit 12, the value set by the base current setting circuit 11 from the value set by the shorting current setting circuit 13. A current detecting element 15 is provided for detecting the welding current, and a current control circuit 16 controls the output current in accordance with a feedback signal from the current detecting element 15 and a set signal from the selector circuit 14. Numeral 17 indicates a flywheel diode.

In a welding method where the wire 1 is automatically fed toward the base metal 3, the heat input to the base metal 3 is desirably small. To meet this end, the length of the arc 2 (arc length) is reduced. When the wire 1 and base metal 3 are shorted, the molten globule at the tip of the wire 1 is transferred to the base metal 3 to establish an arc between the wire and base, and then the wire and base are shorted to develop an arc. This method of welding, which depends on the cyclic establishment of short circuits and arcs is referred to as short circuit transfer welding. FIG. 1 is thus a block diagram showing an embodiment of a DC arc welding machine which performs short circuit transfer welding.

FIG. 2 is a diagram showing the waveform of the welding current produced by the welding machine of FIG. 1. In FIG. 2, time is plotted on the horizontal axis, and welding current on the vertical axis. In the time period Ts, the wire 1 and base metal 3 are shorted and the welding current is increased. In the time period Ta1 that immediately follows the removal of the short circuit, an arc is developed between the wire 1 and base metal 3 and the welding current is decreased. In the time period Ta2, an arc is also developed between the wire 1 and the base metal 3, but the welding current is at a constant level IB.

In FIG. 1, welding is begun by feeding the wire toward the base metal 3. The wire feed rate is controlled by the number of revolutions of the motor 9, which is turn is controlled by the variable resistor 7. Therefore, the wire feed rate can be controlled by the variable resistor 7. The welding current is controlled by the current control circuit 16, which compares a feedback signal ef from the current detection element 15 with a current set signal ei and delivers two signals, e.g. "high" and "low", to the drive circuti 6. The drive circuit 6 sends a drive signal to the switching element 5 in response to the "high" or "low" signals. When the switching element 5 is conducting, welding current flows from the DC power supply 4 through a path comprising the switching element 5, the wire 1, the arc 2, the base metal 3 and the current detection element 15, and returns to the DC power supply 4. When the switching element 5 is not conducting, a current delay factor (not shown) in the circuit causes the welding current to flow through a path comprising the flywheel diode 17, wire 1, arc 2, base metal 3 and current detection element 15, and returns to the flywheel diode 17, and at no time does the welding current become zero immediately after the switching element 5 is rendered nonconducting. Therefore, a constant current can be supplied to the arc 2 by causing the switching element 5 to alternate between its "conducting" and "nonconducting" states at a given rate and by utilizing feedback control on the welding current.

The function of the selector circuit 14 is to transmit to the current control circuit 16 either a current setting signal $e_{is}$ from the shorting current setting circuit 13 or a current setting signal $e_{ia}$ from the base current setting circuit 11 in response to a command from the shorting detection circuit 12. When the wire and base metal are short-circuited, a command from the shorting detection circuit 12 causes the selector circuit 14 to transmit, to the current control circuit 16, the current setting signal $e_{is}$ from the shorting current setting circuit 13 as the signal ei. The current control circuit 16 compares a feedback signal ef from the current detection element 15 with the signal ei from the selector circuit 14 and delivers a "high" of "low" signal to the drive circuit 6. The drive circuit 6 amplifies the "high" and "low" signals from the current control circuit 16 and turns the switching element 5 on or off in response to the amplified signals.

A molten globule at the tip of the wire is transferred to the base metal and the short circuit is removed. When the short circuit between the wire and the base metal is removed, the short detection circuit 12 delivers a short circuit removal signal $e_{is}$ to both the shorting current setting circuit 13 and selector circuit 14 for a certain period (the time period Ta1 in FIG. 2). The shorting current setting circuit 13 then outputs a shorting current setting signal $e_{is}$ that causes the large welding current immediately after the removal of the short circuit to be changed to a relatively small welding current IB without disturbing the arc being developed between the wire and the base metal. While receiving the short circuit removal signal $e_{is}$ from the shorting detection circuit 12, the selector circuit 14 sends a short current setting signal $e_{is}$ from the setting circuit 13 to the current control circuit 16 as the signal ei, and as a result, the welding current is changed from the large shorting current to a relatively small welding current IB without disturbing the arc being developed between the wire and the base metal. In the subsequent period (time period Ta2 in FIG. 2) until the wire and the base metal are again short-circuited, the short detection circuit 12 remains off, so the selector circuit 14 cuts off the shorting current setting signal $e_{is}$ from the shorting current setting circuit 13 and transmits the base current setting signal $e_{ia}$ from the base current setting circuit 11 to the current control circuit 16 as the signal ei. In consequence, the welding current is maintained at a constant level IB during the period Ta2.

With the circuit configuration described above, the DC arc welder of FIG. 1 is capable of welding with a consumable electrode using a power supply having constant current characteristics. But on the other hand, if the time period during which the arc is developed between the wire and the base metal is decreased, the period Ta2 is correspondingly decreased, and the control of the welding current IB with the variable resistor 7 alone is not capable of producing consistent welding because less wire is melted in comparison with the wire feed rate. Therefore, the defect of the conventional DC arc welder is that it is capable of consistent welding within only a limited range of wire feed rates.

SUMMARY OF THE INVENTION

The present invention has been accomplished to eliminate the above described defect of the conventional DC arc welding machine, and its primary purpose is to provide a DC arc welding machine which is capable of consistent welding within a commonly employed range of wire feed rates by supplying a welding current equivalent to the sum of a base current setting signal $e_{ib}$ and a shorting current setting signal $e_{is}$ throughout the period when the wire and the base metal are short-circuited (Ts in FIG. 2) and a subsequent period which immediately follows the removal of the short circuit (Ta1 in FIG. 2).

DETAILED DESCRIPTION OF THE PREFERRED EMBODIMENTS

Figure 1:
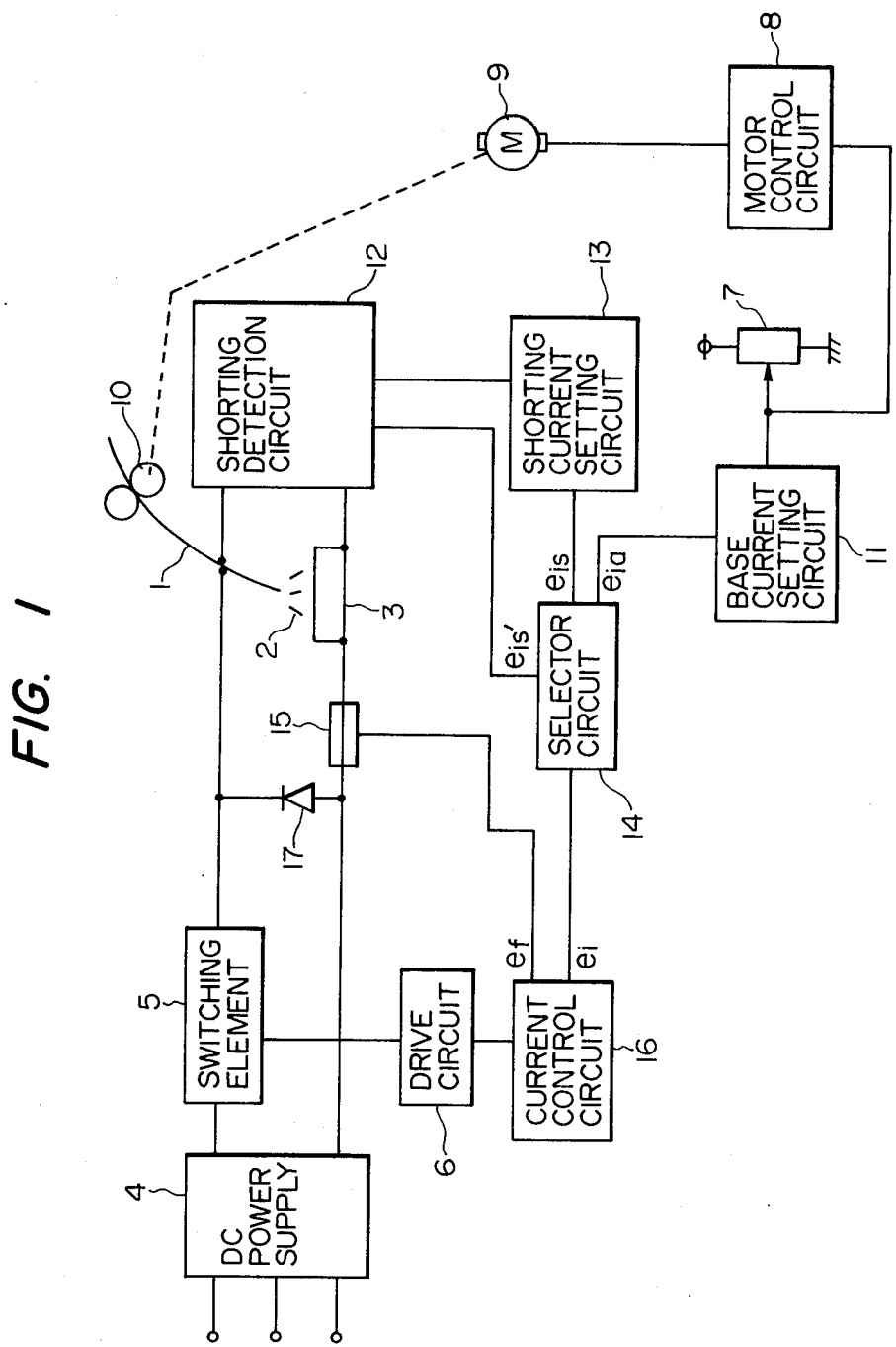
FIG. 1 is a block diagram of a conventional DC arc welding machine.
Figure 4:
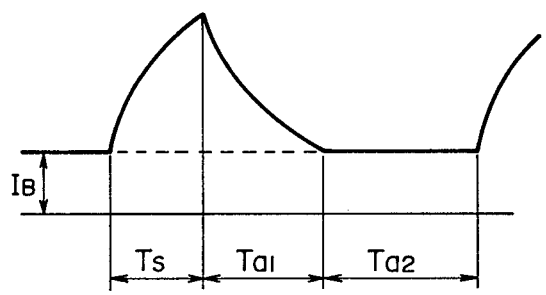
FIG. 4 is an illustration of the waveform of the welding current produced by the DC arc welding machine of FIG. 3.
Figure 3:
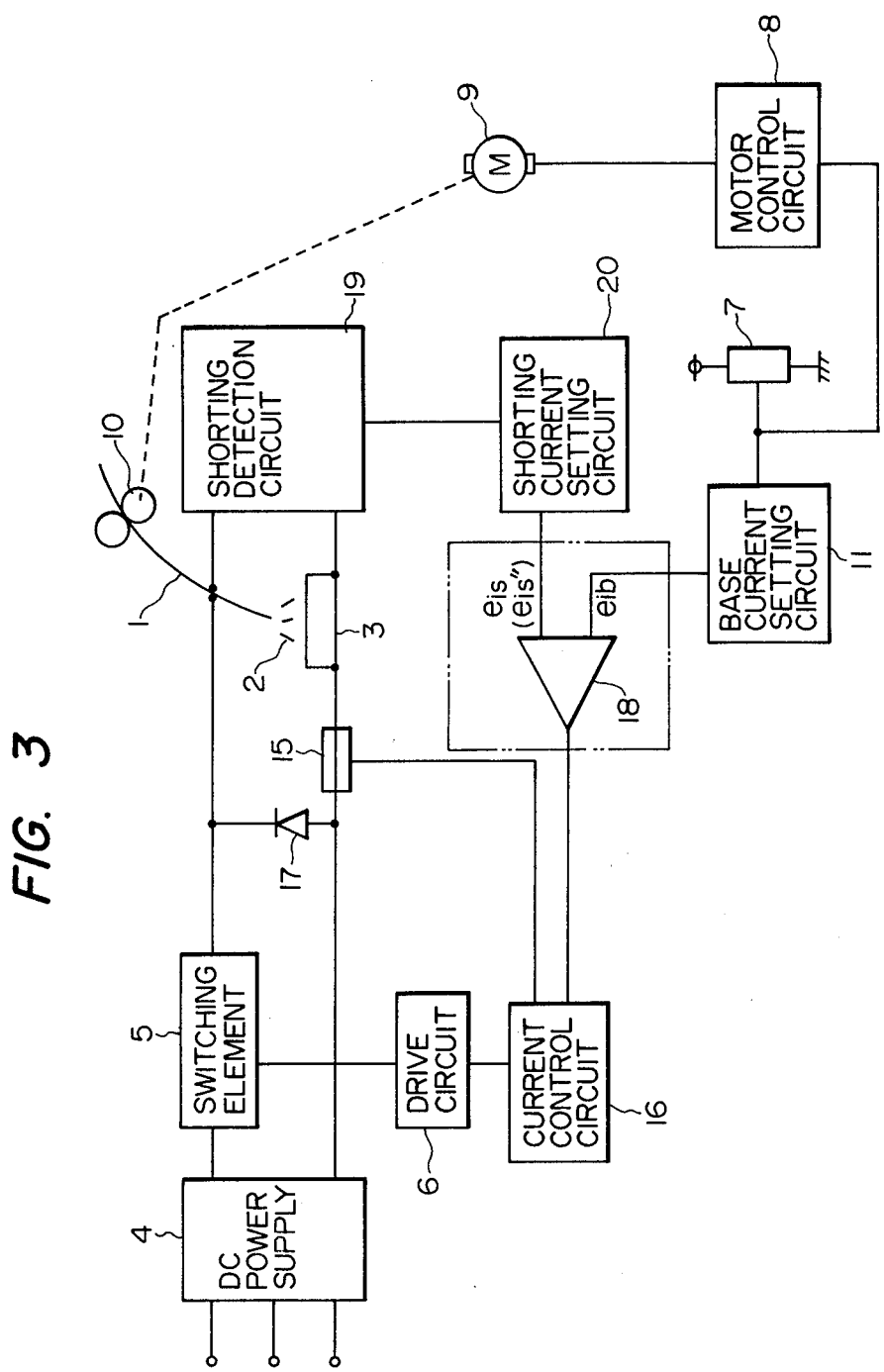
FIG. 3 is a block diagram showing an embodiment of a DC arc welding machine according to the present invention.

A preferred embodiment of the DC arc welding machine of the present invention is described hereunder with reference to FIGS. 3 and 4. The circuit diagram of FIG. 3 includes an adder 18 that forms a sum of a base current setting signal $e_{ib}$ and a shorting current setting signal $e_{is}$, a shorting detection circuit 19 which, unlike the corresponding circuit 12 of FIG. 1, maintains the generation of a signal indicative of a short circuit while the wire 1 and the base metal 3 are shorted, and likewise continually generates a signal indicative of the absence of a short circuit when there is no short, and a shorting current setting circuit 20. In FIG. 3, the numerals corresponding to those used in FIG. 1 represent the corresponding components. FIG. 4 illustrates the waveform of the welding current developed in the embodiment of FIG. 3.

Figure 2:
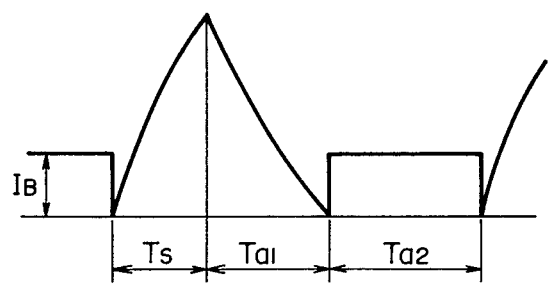
FIG. 2 is an illustration of the waveform of the welding current produced by the DC arc welding machine of FIG. 1.

In the period when an arc is developed between the wire and the base metal (Ta2 in FIG. 4 and excluding the period that immediately follows the removal of a short circuit), the welding machine of FIG. 3 operates in the same manner that the welding machine of FIG. 1 operated in the time period Ta2 in FIG. 2. When the wire and the base metal are shorted, the short detection circuit 19 detects the same and directs a shorting signal to the shorting current setting circuit 20. The shorting current setting circuit 20 is turn produces a shorting current setting signal $e_{is}$ that gradually increases in response to the shorting signal, and supplies it to the adder. The adder forms the sum of the base current setting signal $e_{ib}$ which is being supplied thereto and the shorting current setting signal $e_{is}$, and supplies the sum ($e_{ib}+e_{is}$) to the current control circuit 16. Then, as shown in FIG. 4, the welding current increases continuously from the level IB that was achieved when an arc was developed between the wire and the base metal. When the short circuit between the wire and the base metal is removed, the shorting detection circuit 19 detects the same and stops supplying the shorting signal. Instead, the shorting current setting circuit 20 produces a shorting current setting signal $e_{is'}$ that gradually decreases from the value produced immediately before the stoppage of the shorting signal and which becomes zero after a given time has passed (the period Ta1 in FIG. 4), and supplies this shorting current setting signal $e_{is}$ to the adder. The adder produces the sum of the base current setting signal $e_{ib}$ and the shorting current setting signal $e_{is'}$ and applies it to the current control circuit 16 as a current setting signal. As a result, the welding current continuously decreases from the peak value shown in FIG. 4 to the final value IB. In other words, the base current setting signal set by the variable resistor 7 is added to the current setting signal not only in the shorting period (Ts in FIG. 4) but also in the arc generating period (Ta1 in FIG. 4) that immediately follows the removal of the short circuit.

The illustrated embodiment assumes a constant wire feed rate, but the wire feed rate may be subjected to feedback control using the arc voltage. The embodiment also assumes a circuit configuration which uses a single variable resistor 7 to adjust both the wire feed rate and the base current. This circuitry may be replaced by a circuit configuration which uses two variable resistors to adjust the wire feed rate and the base current separately, or by a circuit configuration that uses two variable resistors, one for adjusting both the wire feed rate and the base current, and the other for making fine adjustments in the wire feed rate or the base current.

As described in the foregoing, the DC arc welding machine of the present invention uses the sum of the base current setting signal and shorting current setting signal to control the welding current both in the shorting period and in the subsequent period immediately following the removal of the short circuit, so that the welding machine is capable of consistent welding using a commonly employed range of wire feed rates. As a further advantage, the necessary control circuit can be manufactured at low cost.

What is claimed is:

1. A direct current arc welding machine comprising:

a consumable electrode placed opposite to a workpiece to be welded;

a power supply for supplying a welding current between said electrode and said workpiece;

a switching element connected to the output of said power supply for controlling the welding current supplied between said consumable electrode and said workpiece during a first time interval in which a short circuit occurs between said electrode and workpiece and during subsequent second and third time intervals during which no short circuit occurs between said electrode and workpiece;

a shorting detection circuit connected between said consumable electrode and said workpiece for detecting any short circuit therebetween and for generating a first signal during a detected short circuit in said first time interval and for generating a second signal during said second time interval subsequent to said first time interval;

a base current setting circuit for generating a signal for supplying a constant base current between said consumable electrode and said workpiece, said signal generated by said base current setting circuit representing a constant base current throughout said first, second and third time intervals;

a shorting current setting circuit connected to said shorting detection circuit in which, upon receiving said first signal generates a signal for supplying an increasing current and upon receiving said second signal generates a signal for supplying a decreasing current;

a base current setting circuit for generating a signal for supplying a constant base current between said consumable electrode and said workpiece, said signal generated by said base current setting circuit representing a constant base current throughout said first, second and third time intervals;

a shorting current setting circuit connected to said shorting detection circuit in which, upon receiving said first signal generates a signal for supplying an increasing current and upon receiving said second signal generates a signal for supplying a decreasing current;

an adder connected to both said base current setting circuit and said shorting current setting circuit for forming the sum of the outputs of said base current setting circuit and said shorting current setting circuit; and a welding current control circuit, having an input connected to the output of said adder, for controlling said switching element according to a signal supplied from said adder.

2. A direct-current arc welding machine according to claim 1, said shorting current setting circuit delivering a signal which decreases to zero within a period not longer than a period beginning with the removal of a short circuit and ending when the next short circuit is formed.

3. A direct-current arc welding machine according to claim 1, further comprising means for feeding said electrode toward said workpiece at a wire feed rate, and wherein said constant base current has a level proportional to said wire feed rate.

4. A direct-current arc welding machine comprising:

a consumable electrode placed opposite to a workpiece to be welded and means for feeding said electrode toward said workpiece at a wire feed rate;

a power supply for supplying a welding current between said electrode and said workpiece;

a switching element connected to the output of said power supply for controlling the welding current supplied between said consumable electrode and said workpiece;

a shorting detection circuit connected between said consumable electrode and said workpiece for detecting any short circuit therebetween;

a base current setting circuit for generating a signal for supplying a constant base current between said consumable electrode and said workpiece, said constant base current having a level proportional to said wire feed rate;

a shorting current setting circuit connected to said shoting detection circuit and which, upon recieving from said shorting detection circuit a signal indicative of a detected short circuit, generates a signal for supplying a current larger than the welding current set by said base current setting circuit;

an adder connected to both said base current setting circuit and said shorting current setting circuit for forming the sum of the outputs of said base current setting circuit and said shorting current setting circuit; and a welding current control circuit, having an input connected to the output of said adder, for controlling said switching element according to a signal supplied from said adder.

* * * * *